United States Patent
Ayandeh

(10) Patent No.: US 9,455,906 B2
(45) Date of Patent: Sep. 27, 2016

(54) CONVERGED FABRIC FOR FCOE

(75) Inventor: Siamack Ayandeh, Concord, MA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 14/372,573

(22) PCT Filed: Apr. 30, 2012

(86) PCT No.: PCT/US2012/035745
§ 371 (c)(1),
(2), (4) Date: Jul. 16, 2014

(87) PCT Pub. No.: WO2013/165340
PCT Pub. Date: Nov. 7, 2013

(65) Prior Publication Data
US 2015/0043584 A1    Feb. 12, 2015

(51) Int. Cl.
*H04L 12/721* (2013.01)
*H04L 12/931* (2013.01)
*H04L 12/741* (2013.01)

(52) U.S. Cl.
CPC .............. *H04L 45/66* (2013.01); *H04L 45/74* (2013.01); *H04L 49/351* (2013.01); *H04L 49/357* (2013.01); *H04L 49/70* (2013.01)

(58) Field of Classification Search
None
See application file for complete search history.

(56) References Cited

U.S. PATENT DOCUMENTS

| | | | |
|---|---|---|---|
| 8,948,176 B1 * | 2/2015 | Desanti | H04L 45/44 370/351 |
| 2009/0037977 A1 * | 2/2009 | Gai | H04L 41/00 726/1 |
| 2009/0063701 A1 | 3/2009 | Bagepalli et al. | |
| 2009/0245791 A1 * | 10/2009 | Thaler | H04L 12/4625 398/45 |
| 2009/0292813 A1 | 11/2009 | Snively et al. | |
| 2010/0214950 A1 | 8/2010 | Vobbilisetty | |
| 2010/0232419 A1 | 9/2010 | Rivers | |
| 2011/0032933 A1 | 2/2011 | Eisenhauer et al. | |
| 2011/0135303 A1 | 6/2011 | Hufferd | |
| 2011/0188511 A1 | 8/2011 | Benedetto | |
| 2011/0268127 A1 | 11/2011 | Dhar et al. | |
| 2011/0280255 A1 * | 11/2011 | DeSanti | H04L 29/12801 370/419 |

(Continued)

FOREIGN PATENT DOCUMENTS

| CN | 101990663 A | 3/2011 |
|---|---|---|
| CN | 102098103 A | 6/2011 |
| CN | 102209023 A | 10/2011 |

OTHER PUBLICATIONS

Webster, J., FCoE and Datacenter Fabric Convergence, May 23, 2008.
Office Action, CN Application No. 201280068478.7, Date: Oct. 28, 2015, pp. 1-5.
Claudio Desanti and Joy Jiang, "FCoE in Perspective," ICAIT'08, Jul. 29-31, 2008, Shenzhen, China, 2008, pp. 1-8, ACM.

(Continued)

*Primary Examiner* — Diane Lo
(74) *Attorney, Agent, or Firm* — Brooks, Cameron & Huebsch, PLLC

(57) ABSTRACT

Network devices, systems, and methods, including program instructions are disclosed which provide a converged fabric for Fiber Channel over Ethernet (FCoE). A network device includes a Fiber Channel Controller (FCC), located outside of a lossless Ethernet network. The FCC has a processing resource coupled to a memory. The memory includes program instructions executed by the processing resource to terminate Fiber Channel (FC) Initialization Protocol (FIP) frames, generated to and by initiator and target devices, on the FCC.

14 Claims, 7 Drawing Sheets

(56) References Cited

U.S. PATENT DOCUMENTS

2012/0177370 A1* 7/2012 Berman ................ H04L 49/357 398/58
2012/0275301 A1* 11/2012 Xiong ................... H04L 49/357 370/230

OTHER PUBLICATIONS

Extended European Search Report, EP Application No. 12875996.6, Date: Dec. 8, 2015, pp. 1-13.

* cited by examiner

US 9,455,906 B2

CONVERGED FABRIC FOR FCOE

BACKGROUND

Computing networks can include multiple network devices including network devices such as routers, switches, hubs, and computing devices such as servers, desktop PCs, laptops, workstations, mobile devices and peripheral devices, e.g., printers, facsimile devices, and scanners, networked together across wired and/or wireless local and/or wide area network (LANs/WANs).

In current blade server/switch environments networks are used having Fiber Channels (FCs) and/or Fiber Channels over Ethernet (FCoE) connections according to existing backbone 5 (BB5) standards and emerging backbone 6 (BB6) draft standards (currently under development), using compliant converged network adapters and control plane software. Currently FCoE standards involve a FC software stack and look up capability at multiple lossless Ethernet switches along the end to end path from initiator (e.g., host) to target device. This involves network 3 (L3) FC hops in communications between end points and rigid, hierarchical, network topologies. An example of an L3 FC hop is an L3 Destination ID (DID) look up, that may occur for example at an FDF, or another example is an FCF lookup, etc.

DETAILED DESCRIPTION

Figure 1:
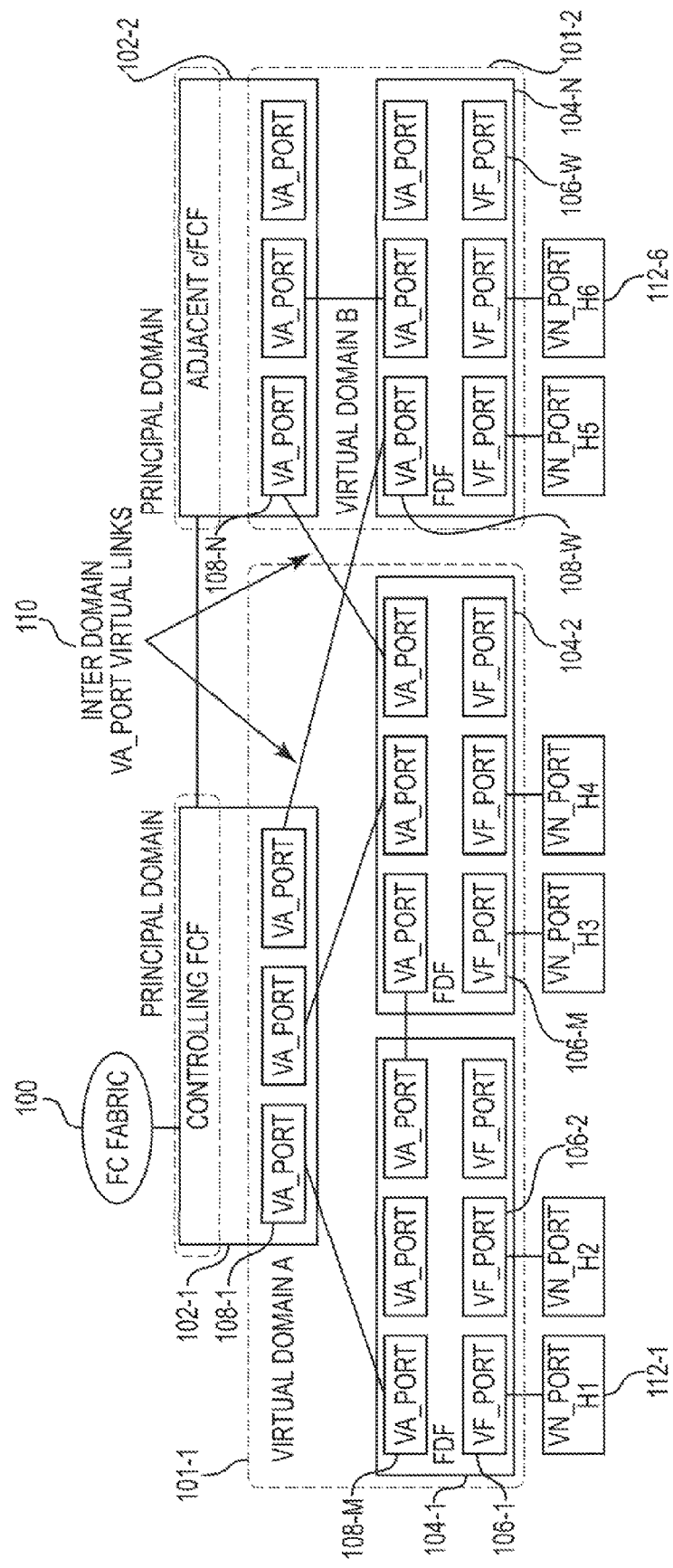
FIG. 1 illustrates an example of a number of virtual domains, e.g., virtual domain A and virtual domain B, among various nodes as part of a FC switching fabric between switches in a network according to an embodiment of the present disclosure.

Embodiments of the present disclosure may include network device systems, and methods, including computer executable instructions (CEI), e.g., program instructions, which provide a converged fabric for Fiber Channel over Ethernet (FCoE). One network device example includes a Fiber Channel Controller (FCC), located outside of a lossless Ethernet network. The FCC has a processing resource coupled to a memory. The memory includes computer readable instructions, e.g., program instructions, executed by the processing resource to terminate Fiber Channel (FC) Initialization Protocol (FIP) frames generated to and by initiator and target devices. Embodiments allow a switch to forward frames over a lossless Ethernet fabric end to end without the use of a full FC software stack in the switch or the use of L3 look ups, for example.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the embodiments of this disclosure, and it is to be understood that other examples may be utilized and that process, electrical, logical and/or structural changes may be made without departing from the scope of the present disclosure.

As used herein, the designators "N," "M," "Q", "R", "S", and "W," particularly with respect to reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 FIG. 2 and/or 302 in FIG. 3. Elements shown in the various figures herein can be added, exchanged, and/or eliminated so as to provide a number of additional examples of the present disclosure, in addition, the proportion and the relative scale of the elements provided in the figures are intended to illustrate the examples of the present disclosure, and should not be taken in a limiting sense.

FIG. 1 illustrates an example of a number of virtual domains, e.g., virtual domain A (101-1) and virtual domain B (101-2), among various nodes as part of a FC switching fabric 100 between switches in a network according to an embodiment of the present invention. The virtual domains, 101-1 and 101-2, can form part of a storage area network (SAN) switching fabric (SAN fabric) 100. A SAN Fabric 100 is a collection of fiber channel (FC) switches and/or fiber channel over Ethernet (FCoE) forwarders (FCF) which share a fiber channel fabric mapping (FCF_MAP) and run fabric protocols over their "E" Ports (E_Ports) and/or virtual E_Ports (VE_Ports). E_Ports are a type of port for connecting switches. The FCF_MAP is a unique identifier for the SAN Fabric 100. While switches and switching fabric are used in the example of FIG. 1, embodiments are not limited to switches and switching fabric for network devices. Further, while only two virtual domains 101-1 and 101-2 are shown, embodiments are not limited to two virtual domains. A virtual component, e.g., port, or connection, e.g., link, is a logical connection versus an express physical connection.

FIG. 1 shows the evolution of FCoE standards from existing Backbone 5 (BB5) to draft proposal Backbone 6 (BB6). In BB6, the nodes in a SAN Fabric can include a controlling FCF node 102-1 and an adjacent controlling FCF node (c/FCF) 102-2 each with their own principal domain. The nodes in the SAN Fabric can further include a number of FCoE Data Forwarder (FDFs), e.g., 104-1, 104-2, . . . , 104-N, associated with an FCF node, e.g., 102-1 and 102-2, in the SAN Fabric 100.

For native FC the FCF node is referred to as FCCF and the FDF node is referred to as FCDF. An FDF can be a top of rack (ToR) switch and an FCF an aggregation or end of row (EoR) switch or director class switch as it is called in FC parlance. FCFs are nodes within a network or in FC terms a so called fabric. FDFs are only visible within a virtual domain or distributed switch. Nodes are connected with links to form the SAN or "fabric". Links connect ports which are of various types N, F, A, E, etc., and described more below. A fabric is a collection of switches which share a database and a so termed FC_MAP.

Each FDF, 104-1, 104-2, . . . , 104-N, includes a number of "F" ports (F_Ports) and/or virtual F_Ports (VF_Ports), e.g., 106-1, 106-2, . . . , 106-M, . . . , 106-W. F_Ports are a type of port terminating at a switch and can terminate the SAN fabric to "N" ports (N-Ports) and/or virtual N_Ports (VN_Ports) on a number of host devices, e.g, hosts 112-1, 112-2, . . . , 112-6, in a network. N_Ports are a type of port designation on a host device for connecting to switches.

As shown in FIG. 1, each FCF node 101-1 and 101-2 and each FDF node 104-1 and 104-2 is additionally provided with a number of "A" port (A_Ports) and/or virtual A_Ports (VA_Ports), e.g., 108-1, 108-2, . . . , 108-M, . . . , 108-W. An A_Port is a new type of port, consisting of hardware, e.g., logic in the form of an application specific integrated circuit (ASIC), provided to the FCF nodes 101-1 and 101-2 and the FDF nodes 104-1 and 104-2. A_Ports allow FCF to FDF and FDF to FDF node connectivity within a distributed switch and virtual domain.

In networking parlance, layer one (L1) is considered the physical layer, e.g. physical Ethernet connections. Layer two (L2) is considered the Media Access Controller (MAC) and Ethernet protocol. FC forwarding is considered as a layer three (L3). For example, by way of illustration and not by way of limitation, an L2 Datacenter Bridge (DCB) path is a lossless Ethernet technology consisting of IEEE 802.1Qau, 802.1Qbz and 802.1Qbb standards. Further, by way of illustration and not by way of limitation, L3 FC may include functionality for both control and forwarding plane including L3 Destination ID (DID) based forwarding and possible hard zoning. Hard zoning is a function in L3, performed by executing program instructions to configure filters, e.g., Access Control Lists (ACLs), that are used in the forwarding path to block access by a host to particular target devices even if the host has a valid address for the target device. By contrast, soft zoning is a functionality that may be performed in L3, where a query by a host for address information to particular target devices may be blocked in the control plane, but the same host possessing the valid address information for those same particular target devices will not be blocked from access to those target devices in the forwarding, e.g, data plane.

Figure 2:
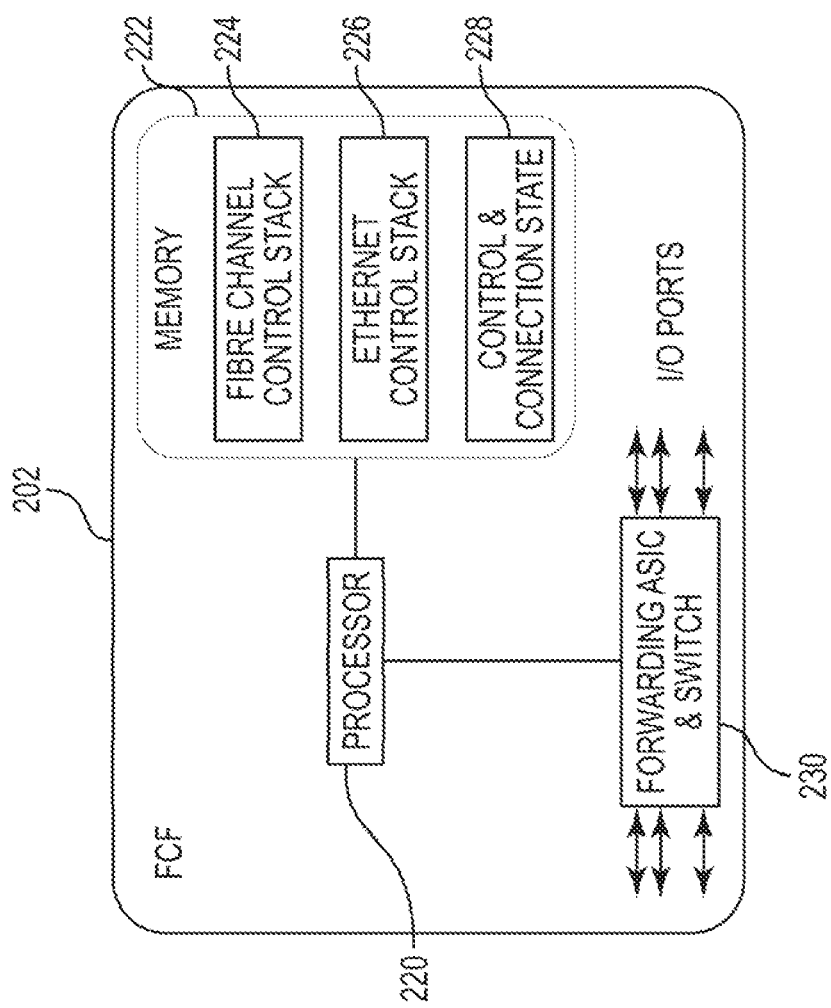
FIG. 2 illustrates an example of an FCoE Channel Forwarder (FCF) node which, in the virtual domain, performs the functions of a switch.

FIG. 2 illustrates an example of an FCoE forwarder (FCF) node. As shown in the embodiment of FIG. 2, an FCF node, e.g. as part of a virtual switch, can include a processor 220, e.g. processing resource coupled to a memory 222. As shown in the embodiment of FIG. 2, an FCF node can include access to a memory 222 associated with the FCF node 202. The memory 222 may include a fiber channel control stack 224, e.g., control plane software (computer executable instructions or program instructions). The memory 222 associated with an FCF node 202 may further include an Ethernet control stack 226, and control and connection state 228, including instructions executable to track and monitor a connection state of a given host, e.g., host 112-1, . . . , 112-6 in FIG. 1.

Embodiments of the present disclosure support FCoE VN_Port to VN_Port communications over a lossless Ethernet fabric without involving a full set of the FC stack, e.g., only using a subset of the FC stack, illustrated in FIG. 2 and without involving and/or performing L3 lookups, e.g., FC DID lookups along the path. As used herein, reference to FC control stack functions is intended to reference functions as defined in the BackBone 5 (BB5) standard and according to BackBone 6 (BB6) draft standards, currently under development. That is, embodiments may eliminate the FC software stack use from DCB switches in the end to end path, significantly streamlining switches. As described in more detail in connection with FIG. 4, an FCC supports a subset of the FC stack, e.g., there is no Fiber channel Shortest Path Forward (FSPF) protocol. By eliminating L3 FC hops in communications between endpoints, the embodiments allow for flexible flat topology connectivity patterns, e.g., flat tree or Clos, in contrast to current rigid, hierarchical network topologies. Flexible flat topology connectivity patterns can remove potential choke points in the network by introducing support for load balancing.

It is noted that the BB6 standard does include a VN_Port to VN_Port fabricless capability. That is, there is no FC control stack in the picture. However, this BB6 capability involves upgrades to adapters at the network edge and is not compatible with BB5 compliant adapters. Furthermore, the BB6 VN_to VN approach operates without a fabric and puts all the burden of connection setups, packet filtering, etc., on adapters at end points. Hence, the BB6 approach involves a new generation of more complex adapters and is also limited in the number of VN_Ports that can be supported. Embodiments described herein are different in that a network device, e.g., Fiber Channel Controller (FCC) maintains a subset of the FC Control stack and additional FCoE functions. Instructions are executed by the FCC to configure edge switches to enforce hard zoning at Ethernet L2 layer, in a manner that is backward compatible with BB5 adapters and is more scalable than the proposed VN_to_VN in BB6 while maintaining the current operational practices of FC, e.g., the operational practice of using a fabric controller.

Figure 3:
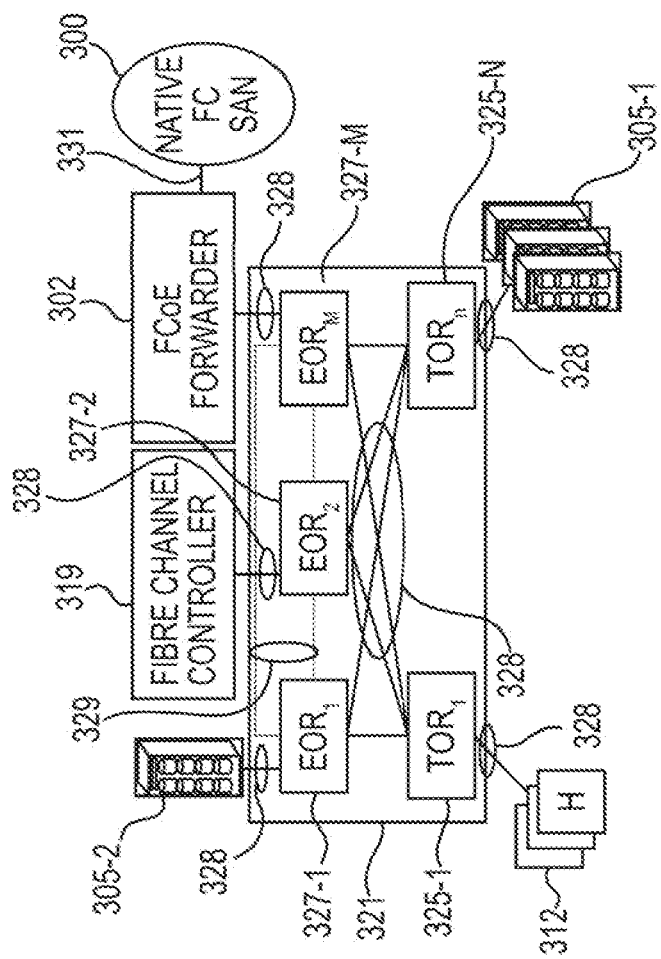
FIG. 3 illustrates an example of an FCoE end to end connectivity between initiator (host) and target devices according to an embodiment of the present disclosure.

FIG. 3 illustrates an example of a converged fabric for FCoE according to a native FC SAN fabric 300 having end to end connectivity between initiators 312 (e.g., hosts 112-1, . . . , 112-6 in FIG. 1) and target devices 305 (e.g., storage devices) according to an embodiment of the present invention. The embodiment of FIG. 3 illustrates a network that supports FCoE interfaces using BB5 and BB6 compliant converged network adapters (not shown). Frames go over a lossless Ethernet fabric 321 end to end between initiators, e.g., hosts (H) 312 and legacy targets (not shown). The example embodiment of FIG. 3 illustrates end to end connectivity between initiators 312 (hosts) and legacy targets using existing and/or legacy SAN 300 via a standard FCF 302 (202 in FIGS. 2 and 102 in FIG. 1) function as defined, for example, in the T11.03 BB5 standards and/or proposed BB6 draft standards.

The example embodiment of FIG. 3 illustrates a number of hosts 312 and a number of target devices, e.g., 305. The number of hosts 312 and the number of target device 305 connect to a lossless Ethernet layer 321 of a network device via L2 DCB links 328. The lossless Ethernet network 321 can include a number of edge nodes 325-1, . . . , 325-N, e.g., Top of Rack (ToR) switches in the virtual domain, and a number of aggregator nodes 327-1, 327-2, . . . , 327-M, e.g., End of Rack (EoR) switches in the virtual domain. A host 312 to target device, e.g., storage device 305, storage architecture can be edge to edge, e.g., host 312 to storage device (305-1) via ToR nodes (325-1, . . . , 325-N), and/or edge to core, e.g., aggregator nodes (327-1, 327-2, . . . , 327-M) to storage device (305-2), connected by DCB links 323. The lossless Ethernet fabric 321 operates at an L2 level.

As shown in the example embodiment of FIG. 3, a network device can be a switch having an FCoE Channel Forwarder (FCF) 302 and a Fiber Channel Controller (FCC) 319. The FCC 319 includes a processing resource and a memory. The memory includes program instructions that are executed by the processing resource to terminate an FC Initialization Protocol (FIP), generated to and by the hosts 312 and target devices 305, carried over the lossless Ethernet network 321. The FCC 319 is not involved in forwarding of data traffic and only terminates control frames. By way of example, the FCC 319 is connected to one or more aggregators 327-1, 327-2, ..., 327-M which may be interconnected using core switch links 329. The FCF 302 can be connected to the native SAN fabric via FC links 331. Other topologies are also possible and the embodiment of FIG. 3 is just one example.

The FCC 319 executes program instructions to terminate the FIP frames, generated to and by the hosts 312 and target devices 305, outside of the lossless Ethernet network 321 such that all data traffic end to end, e.g., hosts 312 to target devices 305, goes over the lossless Ethernet network 321 using only L2 lookups. That is, there is no FC L3 lookup or software stack in any switch within the Ethernet fabric 321.

Figure 4:
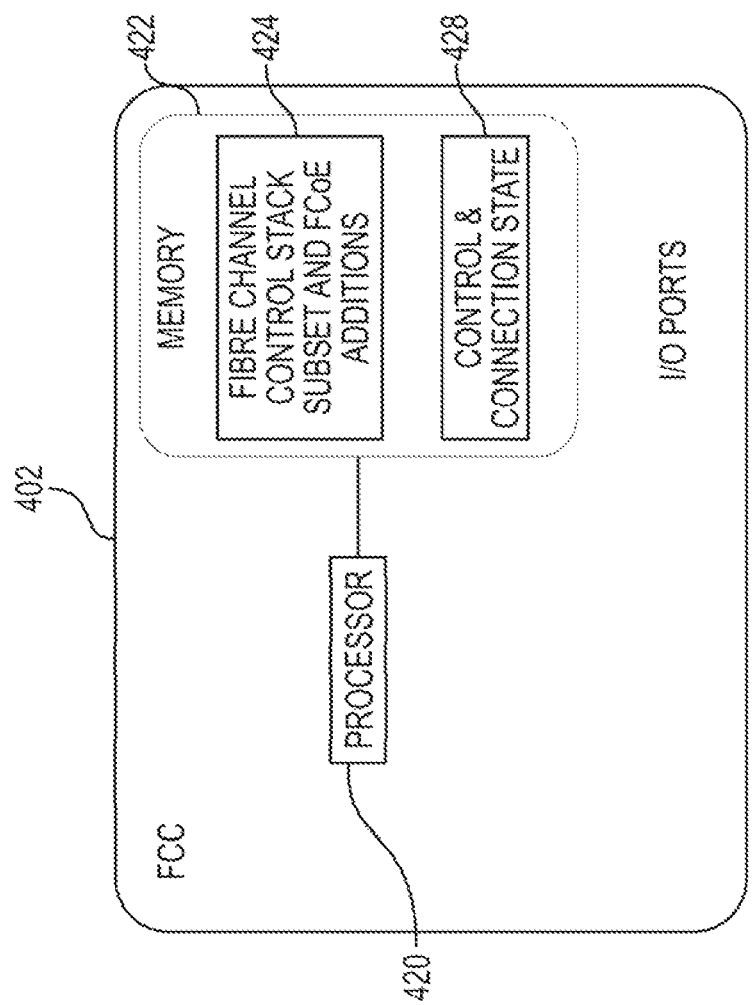
FIG. 4 illustrates an example of an FCC according to an embodiment of the present disclosure.

FIG. 4 illustrates an example of a Fiber Channel Controller (FCC) network device 402 according to an embodiment of the present disclosure. As shown in the example embodiment of FIG. 3, the FCC 402 is located outside of a lossless Ethernet network, e.g., 321 in FIG. 3. In at least one embodiment the FCC 402 functionality may reside on a network attached server. The FCC 402 includes a processing resource, e.g., process 420 coupled to a memory 422.

As shown in the example embodiment of FIG. 4, the memory 422 includes only a subset of a fiber channel (FC) control stack functions along with an number of additional FCoE capabilities 424, e.g., control plane software (computer executable instructions or program instructions). As used herein, reference to FC control stack functions is intended to reference functions as defined in the BackBone 5 (BB5) standard and according to BackBone 6 (BB6) draft standards, currently under development. The memory 422 associated with an FCC node 402 further includes control and connection state information 428, including instructions executable to track and monitor a connection state of a given host, e.g., host 112-1, ..., 112-6 in FIG. 1 or 312 FIG. 3. The FCC does not involve an Ethernet control stack or forwarding ASIC and switch as does the FCF shown in FIG. 2.

Program instructions are stored in the memory 422 and executed by the processing resource 420 to terminate Fiber channel Initialization Protocol (FIP) frames, generated to and by initiator and target devices. The FC control stack subset 424 of the FCC 402 includes instructions that are executed to terminate a Fiber channel Login (FLOGI) procedure. The FC control stack subset and additional FCoE capabilities 424 include control plane instructions to configure edge switches, e.g., 325-1, ..., 325-N, in the lossless Ethernet 321 of FIG. 3. In at least one embodiment, the FC control stack subset and additional FCoE capabilities 424 include instructions that can be executed for soft zoning; FLOGI and destination ID (DID) assignment; FC Keep_Alive (FKA) generation and maintenance for logged in connections; and management triggers for configuration of hard zoning at edge switches: and the additional FCoE capabilities include a virtual local area network (VLAN) discovery capability; and a FIP discovery capability.

Figure 5:
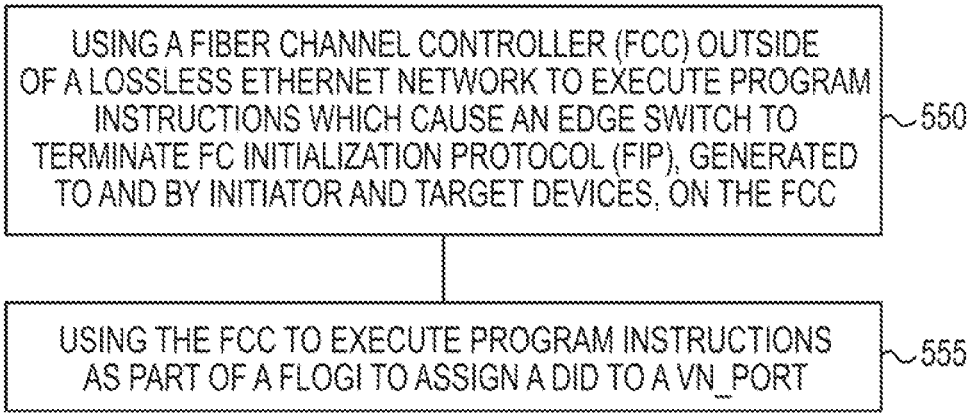
FIG. 5 illustrates a flow diagram of a method embodiment including program instructions according to the present disclosure.

FIG. 5 illustrates a flow diagram of one method embodiment according to the present disclosure. The example embodiment of FIG. 5 illustrates a BB5 standards or BB6 draft standard compatible execution of the FLOGI program instructions stored on the FCC outside of the lossless Ethernet layer. FCC only supports a subset of the full FC software stack, e.g., as that shown in the FCF of FIG. 2.

As shown at block 550 in the example embodiment of FIG. 5, program instructions are stored in a memory, e.g., memory of the FCC (422 in FIG. 4), and executed by a processing resource of the FCC (420 in FIG. 4), to terminate FC Initialization Protocol (FIP), generated to and by initiator 312 (hosts) and target 305 devices, outside of a lossless Ethernet fabric (321 in FIG. 3). That is, as shown in FIG. 3, the program instructions are executed by a Fiber Channel Controller (FCC) 319 outside of the lossless Ethernet layer 321. The program instructions of the FCC support only a sub set of functions defined in backbone 5 (BB5) standard and backbone 6 (BB6) draft standards (FC SW5/BB5/SW6/BB6) to terminate an FC Login (FLOGI) procedure. According to embodiments, the subset includes: virtual local area network (VLAN) discovery; FIP discovery; soft zoning; FLOGI and destination ID (DID) assignment; FC Keep_Alive (FKA) generation and maintenance for logged in connections; and management triggers for configuration of hard zoning at edge switches, e.g., TORs 325-1, ..., 325-N in FIG. 3.

At block 555 the program instructions are executed to assign a FC destination identifier (DID) associated with a storage area network (SAN) fabric, to a host VN_Port upon completion of an FC Login (FLOGI) procedure. The program instructions executed by FCC also assign an FC_Map together with the assigned DID as a concatenation of the FC_Map and the DID (FC_Map+DID) as the source MAC address to the VN_Port. The concatenation of FC_Map+DID is used by the VN_Ports as their source MAC addresses.

Through management configuration, not shown in the figures, an edge switch, e.g., ToRs 325-1, ..., 325-N, are configured to perform a MAC destination address re-write for frames with Ethertype set to FCoE payload. The program instructions are executed to cause the edge switch to re-write the MAC destination address to FC_MAP+DID. DID is carried in the frame as part of its FC frame encapsulation. The frames generated by BB5 compatible adapters carry the FCC MAC as their destination address. In this example embodiment, the FCC MAC address is replaced with the "FC_MAP+DID" MAC address to ensure inter-operability with BB5 compliant converged network adapters (CNAs). A converged network adapter (CAN) is an adapter that can carry both native Ethernet as well as Ethernet encapsulated FC frames.

In a return path, the program instructions are executed to configure edge switches to replace the source MAC address (which is the assigned MAC address) with a MAC address of the FCC.

Figure 6:
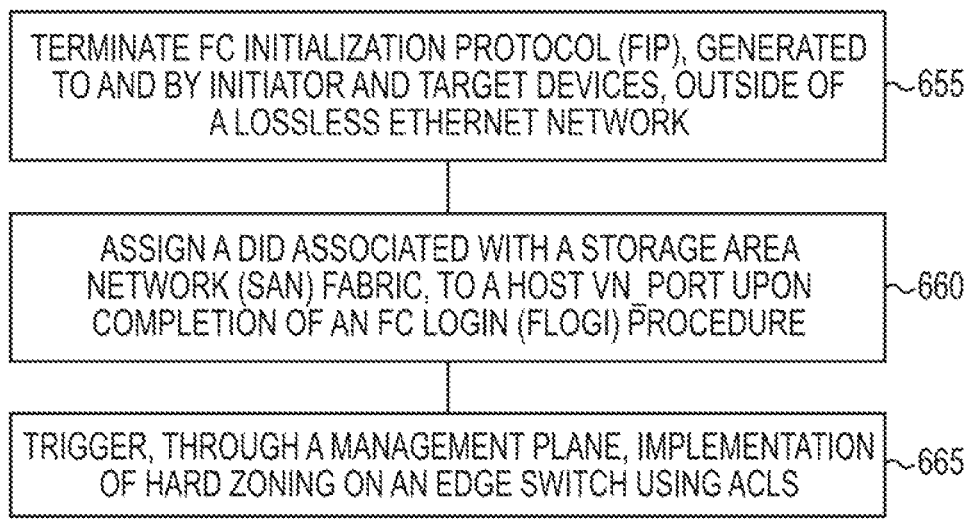
FIG. 6 illustrates a flow diagram of another method embodiment including program instructions according to the present disclosure.

FIG. 6 illustrates flow diagram of another method embodiment according to the present disclosure. The example embodiment of FIG. 6 illustrates a hard zoning functionality that can interface to both BB5 and BB6 compliant converged network adapters (CNAs) through the execution of the program instructions stored on the FCC outside of the lossless Ethernet network.

As shown at block 655 in the example embodiment of FIG. 6, program instructions are stored in a memory, e.g., memory 422 of the FCC 402 in FIG. 4), and executed by a processing resource of a network device, e.g., switch, to terminate FC Initialization Protocol (FIP), generated to and by initiator 312 (hosts) and target 305 devices, outside of a lossless Ethernet network. Again, the program instructions of the FCC support only a sub set of functions defined in FC (SW5/BB5/SW6/BB6) standards, and additional FCoE capabilities, to terminate an FC Login (FLOGI) procedure, as well as virtual local area network (VLAN) discovery; FIP discovery; soft zoning; destination ID (DID) assignment; FC Keep_Alive (FKA) generation and maintenance; and management trigger for hard zoning.

At block 655 the program instructions are executed to assign a FC Destination ID (DID) address associated with a storage area network (SAN) fabric, to a host VN_Port upon completion of an FC Login (FLOGI) procedure. The program instructions are executed to cause a CNA to assign and use a (FC_Map+assigned DID) as the source MAC address for the VN_Port.

In this example embodiment, the BB6 CNAs used in VN_to_VN port mode can send and receive frames to and from other VN_Ports. Hence, forward path destination address re-writes and return path rewrites are unnecessary if adapters are configured accordingly.

However, as shown at block 660, in this example embodiment the program instructions are executed by the FCC 319 to trigger, through a management plane, hard zoning on an edge switch. In this embodiment, FCC program instructions, stored in a memory on a Fiber Channel Controller (FCC) as control plane instructions outside of a lossless Ethernet network, are executed such that an edge switch, e.g., 325-1, 325-2, ..., 325-N is configured through the management plane, e.g., triggered by FCC, with one of two types of access control lists (ACLs). One type of ACL is used to ensure inter-operability with BB5 compliant converged network adapters A second type of ACL is used for BB6 compliant adapters.

For both types of adapters in a network, the FCC program instructions are executed such that an edge switch, e.g., 325-1, 325-2, ..., 325-N is configured through the management plane to perform frame filtering based on source and destination MAC addresses. These MAC addresses correspond to the FC DIDs which are used by FC for equivalent hard zoning. Both source IDs (SIDs) and destination IDs (DIDs) may be assigned, but may be collectively referred to as VN_Port IDs.

However, in the example embodiment of FIG. 6, the program instructions are executed to trigger the edge switch to use a first type of the two ACL types to filter based on the source MAC address and the encapsulated DID in order to ensure inter-operability with BB5 compliant CNAs. Whereas for BB6 compliant CNAs, used in VN_to_VN port mode, the program instructions are executed to trigger the edge switch to use a second type of the two ACL types which is based on the least significant three bytes of the source and destination MAC address.

Thus, in the embodiments, for communications within the lossless Ethernet fabric, frame forwarding is entirely under control of the lossless Ethernet fabric (L2), e.g., 321 in FIG. 3, end to end without L3 hops. Hard zoning as described above is performed at the edge switches, e.g., 325-1, 325-2, ..., 325-N, and routing frames through the fabric, including multiple path, load balancing and reroutes on failures, etc., does not involve FSPF and are under the control of Ethernet protocols.

Figure 7:
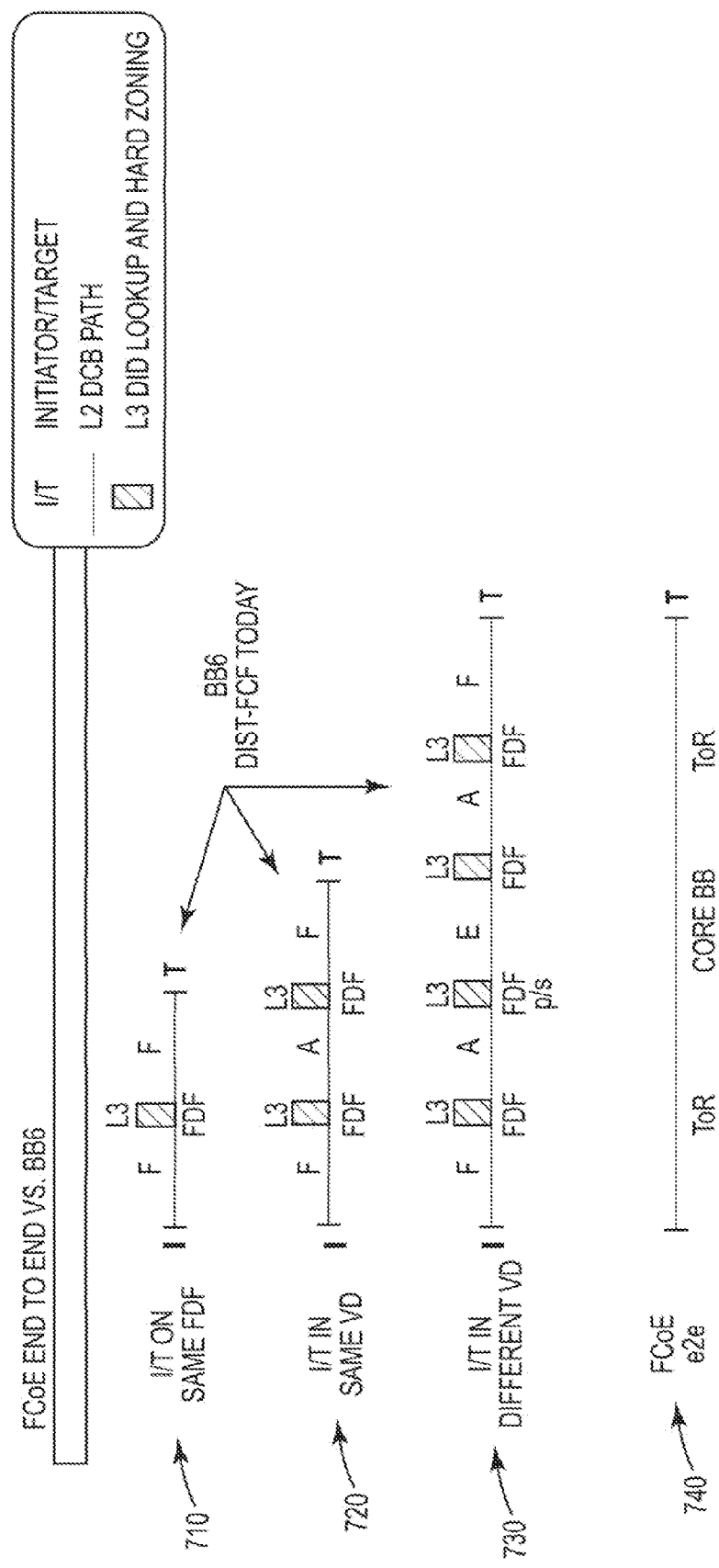
FIG. 7 illustrates L3 FC hops between initiator and target devices n a comparison between BackBone 6 (B86) distributed FCF networks (draft standard currently under development), in various scenarios, to embodiments according to the present disclosure.

FIG. 7 illustrates a comparison of L3 FC hops between initiator and target devices according to current BackBone 6 (BB6) distributed FCF networks, in various scenarios, to embodiments according to the present disclosure. In the example of FIG. 7, the line between initiators and targets (I/Ts) is an L2 DCB path. The bars represent L3 DID lookups and hard zoning.

The first scenario in FIG. 7 (710) illustrates initiators and targets (I/Ts) on the same FDF according to current BB6 distributed FCF networks. in this scenario a frame traveling between the initiator and target would arrive on an F_Port of an FDF which would perform an L3 lookup before traveling through another F_Port to the target.

The second scenario in FIG. 7 (720) illustrates I/Ts in the same virtual domain according to current BB6 distributed FCF networks. In this scenario a frame traveling between the initiator and target would travel arrive through an F_Port to an FDF which would perform an L3 lookup before traveling through an A_Port (e.g., A_Port, A_Link) to another FDF which would perform another L3 lookup, and then through yet another F_Port to the target.

The third scenario in FIG. 7 (730) illustrates I/Ts in the different virtual domains according to current BB6 distributed FCF networks. In this scenario a frame traveling between the initiator and target would arrive through an F_Port to an FDF which would perform an L3 lookup before traveling through an A_Port (e.g., A_Port, A_Link) to an FCF (principal and/or secondary (p/s)) which would perform another L3 lookup, then on through an E_Port (e.g., E_Port, E_Link) to another FCF which would perform an L3 lookup, back on through another A_Port (e.g., A_Port, A_Link) to another FDF which would perform another L3 lookup, and then through yet another F_Port to the target.

The fourth scenario in FIG. 7 (740) illustrates, in contrast, frame forwarding according to embodiments of the present disclosure. As shown in the fourth scenario 740, using the embodiments described herein, a frame can be forwarded through a lossless Ethernet, e.g., 321 in FIG. 3, entirely under the control of the lossless Ethernet fabric, end to end (e.g., initiator to target). That is, according to the embodiments described herein, frames can pass from edge switches (e.g., ToRs 325-1, 325-2, ..., 325-N in FIG. 3) to aggregators (e.g., 327-1, ..., 327-M in FIG. 3), and on to targets and/or back through edge switches to targets without using FC FSPF, L3 lookups or FC L3 hard zoning.

Hence, the embodiments described herein provide for complete separation of control and forwarding. That is, a subset of the FC control stack, e.g., control plane software, is moved entirely out of the lossless Ethernet network. The forwarding is performed entirely by the L2, lossless Ethernet network using shortest path bridging (SPB), TRILL (IETF standard), or other mechanisms. The converged fabric for FCoE of the present disclosure further does not require new ASIC capabilities to forward FC frames. Hard zoning, etc. is applied at the edge switches using ACLs. No FC stack is needed in any Ethernet switch. Since a full FC stack is no longer needed in each switch, switch software design may be significantly simplified.

The embodiments are compatible with both BB5 and BB6 adapters. This allows for fabric convergence within a datacenter as opposed to previous "overlay" approaches in current BB5 and BB6 standards. This additionally allows for flexible connectivity and topology within datacenter fabrics without current restrictions of BB5 and BB6 standards. Since FC/FCoE performance is sensitive to latency, the end to end latency can be reduced by removing L3 hops in the topology. Further, the embodiments enable load balancing at L2 to make more effective use of available bandwidth in the network.

Although specific examples have been illustrated and described herein, those of ordinary skill in the art will appreciate that an arrangement calculated to achieve the same results can be substituted for the specific examples shown. This disclosure is intended to cover adaptations or variations of one or more examples of the present disclosure. It is to be understood that the above description has been made in an illustrative fashion, and not a restrictive one. Combination of the above examples, and other examples not specifically described herein will be apparent to those of skill in the art upon reviewing the above description. The scope of the one or more examples of the present disclosure includes other applications in which the above structures and methods are used. Therefore, the scope of one or more examples of the present disclosure should be determined with reference to the appended claims, along with the full range of equivalents to which such claims are entitled.

The term "a number of" is meant to be understood as including at least one but not limited to one.

What is claimed is:

1. A network device to achieve a converged fabric for FCoE, comprising:
    a processing resource; and
    a memory, the memory having program instructions executed by the processing resource of the network device to:
        terminate Fiber channel Initialization Protocol (FIP) frames, generated to and by initiator and target devices, outside of a lossless Ethernet network;
        terminate an FC Login (FLOGI) procedure and destination ID (DID) assignment and
        provide a management trigger for configuration of hard zoning at an edge switch using access control lists (ACLs).

2. The network device of claim 1, wherein the network device is a Fiber Channel Controller (FCC), wherein the program instructions executed to terminate the FIP are executed by the FCC outside of the lossless Ethernet network.

3. The network device of claim 2, wherein the program instructions are executed by the FCC to perform control plane functionality outside of the lossless Ethernet network.

4. The device of claim 1, wherein the program instructions are executed to allow a switch to forward frames over a lossless Ethernet fabric between two VN_Ports without the use of:
    a full FC software stack in the switch; and
    any L3 look ups.

5. The device of claim 2, wherein the program instructions of the FCC:
    support only a sub set of functions defined in a backbone 5 (BB5) standard and a Backbone 6 (BB6) draft standard, currently under development, the subset including instructions to:
        generate and maintain FC Keep_Alives (FKAs) for logged in connections; and
        provide soft zoning; and
    include FCoE additions, wherein the FCoE additions include:
        a virtual local area network (VLAN) discovery capability; and
        a FIP discovery capability.

6. A method for converged fabric for fiber channel over Ethernet (FCoE), comprising:
    using a Fiber Channel Controller (FCC) outside of a lossless Ethernet network to execute program instructions which cause an edge switch to:
        terminate FC Initialization Protocol (FIP) frames, generated to and by initiator and target devices, on the FCC;
        assign, as part of a Fiber Channel Login (FLOGI) procedure, a Destination ID (DID) associated with a storage area network (SAN) fabric, as a source MAC address to a host VN_Port; and
        assign a concatenation of an FC Map and the DID (FC_Map+DID) as the source MAC address to the VN_Port.

7. The method of claim 6, wherein, in a forward path, the program instructions are executed by the FCC to cause the edge switch to perform a MAC destination address re-write, for frames with Ethertype set to FCoE payload, to FC_MAP+DID.

8. The method of claim 6, wherein the method includes using Registered State Change Notifications (RSCNs) to allow a host to discover other nodes attached to the SAN fabric.

9. The method of claim 6, wherein, in a return path, the program instructions are executed to cause the edge switch to replace the assigned source MAC address with a MAC address of the FCC (FCC_MAC).

10. A non-transitory computer-readable medium storing program instructions executable by a processing resource to:
    terminate FC Initialization Protocol (FIP) frames, generated to and by initiator and target devices, outside of a lossless Ethernet network;
    assign a Destination ID (DID) associated with a storage area network (SAN) fabric, to a host VN_Port upon completion of an FC Login (FLOGI) procedure; and
    trigger, through a management plane, implementation of hard zoning on an edge switch using access control lists (ACLs).

11. The medium of claim 10, wherein executing program instructions to trigger hard zoning includes utilizing program instructions, stored in a memory on a Fiber Channel Controller (FCC) as control plane instructions outside of the lossless Ethernet network.

12. The medium of claim 11, wherein the program instructions are executed to trigger the edge switch to:
    use an ACL for a source MAC address lookup based on a concatenation of an FC MAP and source ID (FC_MAP+SID) as the source MAC address of the host VN_Port.

13. The medium of claim 11, wherein the program instructions are executed to trigger the edge switch to:
    use a first type of ACL for a destination MAC address lookup based on a concatenation of an FCC MAC and destination ID (FCC MAP+DID) as the destination MAC address to ensure inter-operability with BB5 compliant converged network adapters.

14. The medium of claim 11, wherein the program instructions are executed to trigger the edge switch to:
    use a second type of ACL for a destination MAC address lookup based on a concatenation of an FC_MAP and destination ID (FC_MAP+DID) as the destination MAC address for BB6 compliant adapters.

* * * * *